Nov. 25, 1969  S. O. JOHNSON  3,479,995
ROTARY ENGINE
Filed Oct. 2, 1967  4 Sheets-Sheet 1
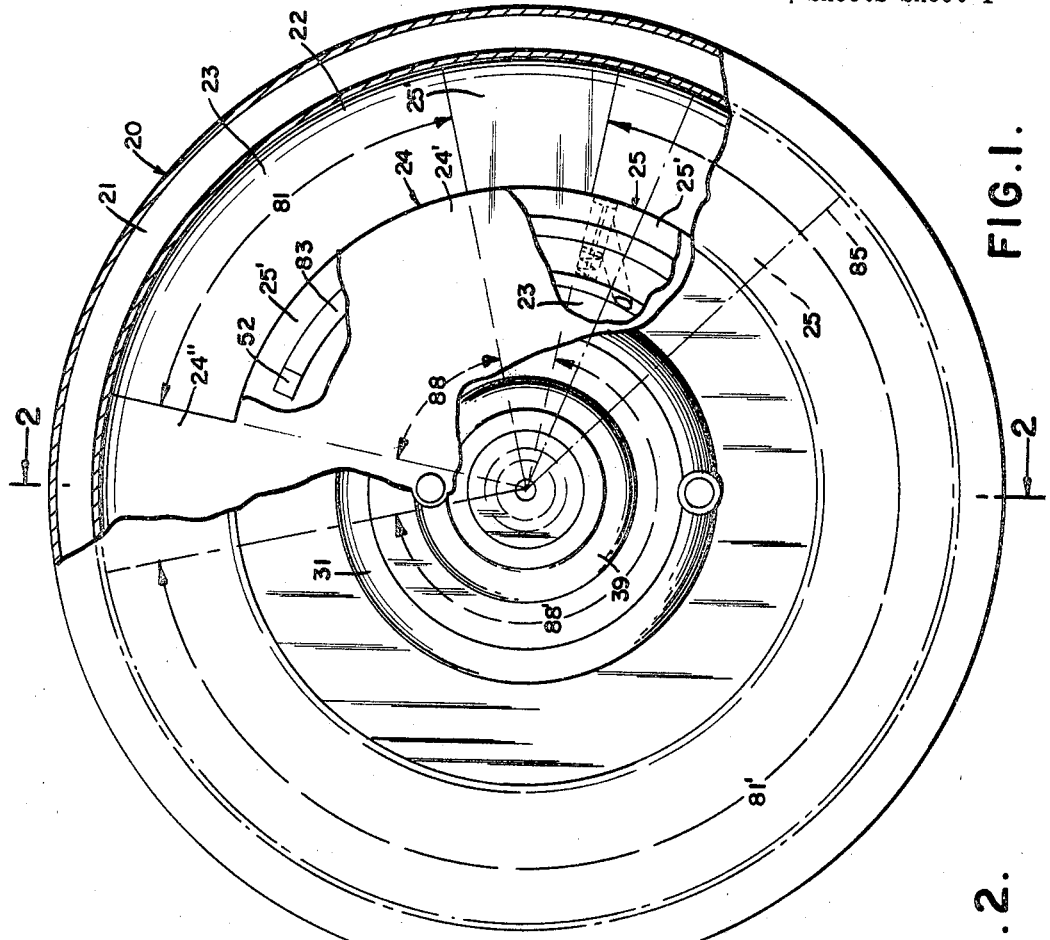
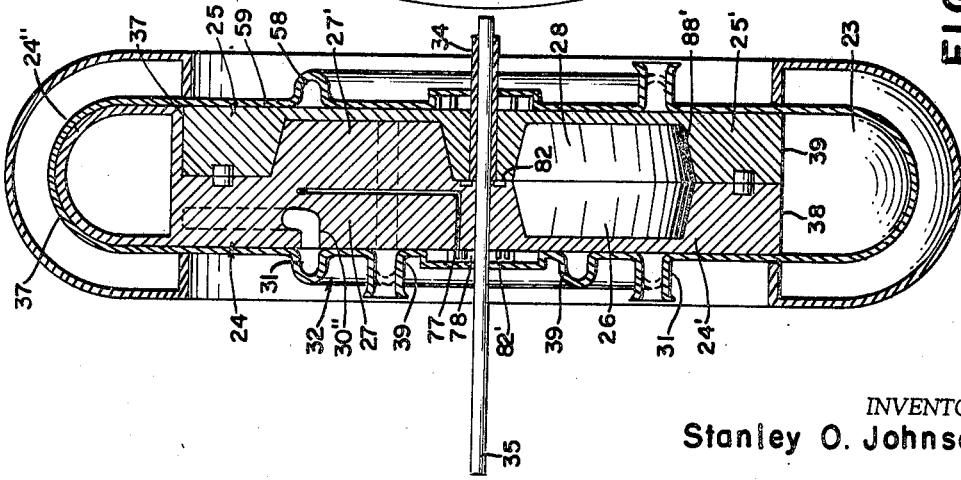
INVENTOR
Stanley O. Johnson
BY Robert E. Klove
ATTORNEY Nov. 25, 1969  S. O. JOHNSON  3,479,995
ROTARY ENGINE Filed Oct. 2, 1967  4 Sheets-Sheet 2

INVENTOR
Stanley O. Johnson

BY Robert E. Kleve
ATTORNEY

Nov. 25, 1969      S. O. JOHNSON      3,479,995
ROTARY ENGINE
Filed Oct. 2, 1967      4 Sheets-Sheet 3
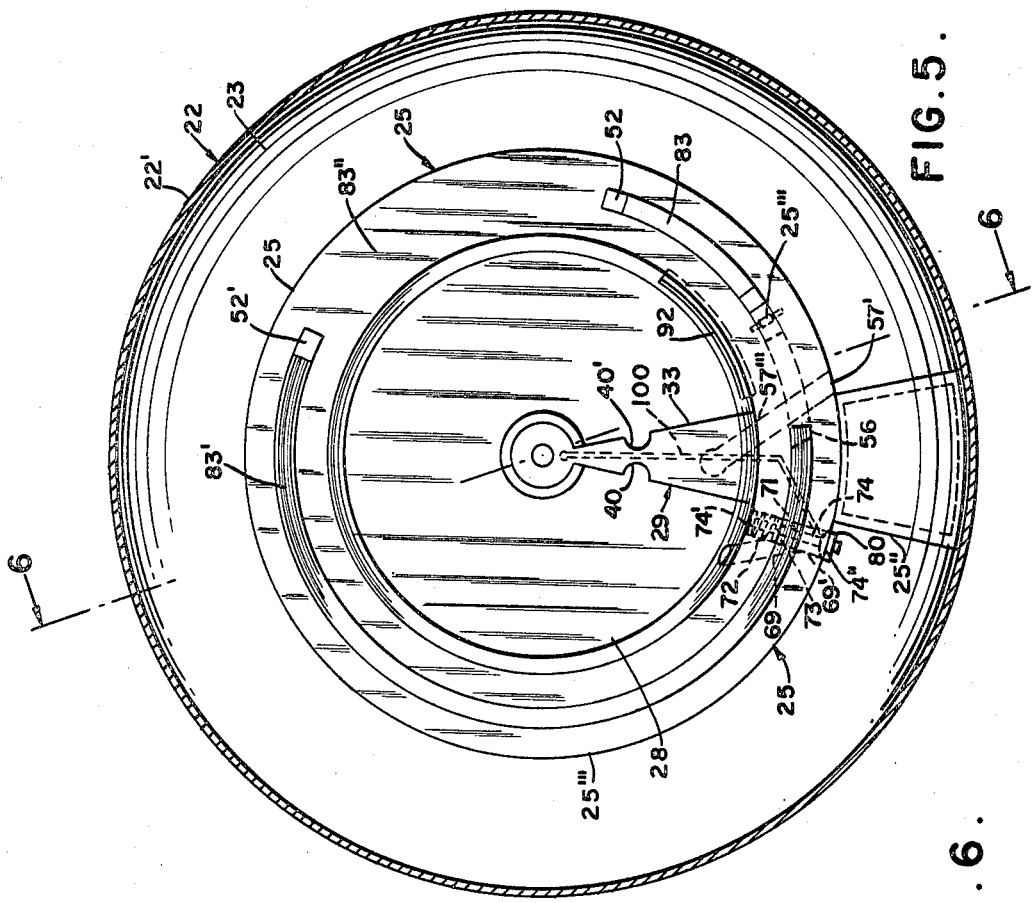
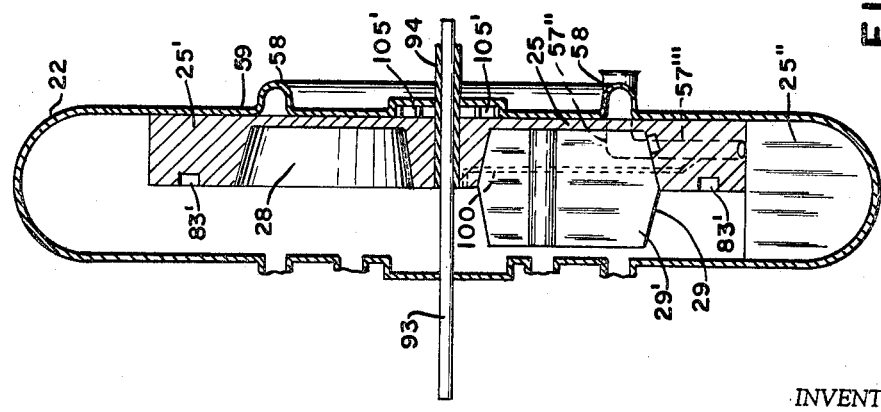
INVENTOR
Stanley O. Johnson
BY *Robert E Klewe*
ATTORNEY INVENTOR
Stanley O. Johnson
BY Robert E. Kleve
ATTORNEY United States Patent Office 3,479,995
Patented Nov. 25, 1969

3,479,995
ROTARY ENGINE
Stanley O. Johnson, Grand Forks, N. Dak. 58201
Filed Oct. 2, 1967, Ser. No. 672,174
Int. Cl. F02b *53/04, 53/06, 55/14*
U.S. Cl. 123—11                                   1 Claim

ABSTRACT OF THE DISCLOSURE

The invention comprises a rotary engine having an annular fixed housing, a pair of disc members rotatably mounted within the housing with a piston fixed to the outer edge of each disc member for travel arcuately within the housing, the disc members having cooperating portions forming an inner pre-compression chamber for pre-compressing fresh gases prior to their combustion, the housing has an pressure differential means to transmit the pre-compressed gases from the pre-compression chamber to the outward interior portions of the housing in the line of travel of the pistons which forms a combustion chamber, the housing has annular ring conduit means to transfer the burnt gases in the combustion chamber out of the engine after combustion.

---

This invention relates to rotary engines, more particularly, the invention relates to rotary combustion engines.

It is an object of this invention to provide a novel rotary engine which can be operated efficiently and can be manufactured with a minimum of expense.

It is a further object of the invention to provide a novel rotary engine having an inner and outer annular chamber with rotary members which form combustion and compression chambers for the engine.

Further objects and advantages of the invention will become apparent as the description proceeds and when taken in conjunction with the accompanying drawings wherein:

FIGURE 1 is a front view of the rotary engine invention.

FIGURE 2 is a cross-sectional side view of the rotary engine invention taken along line 2—2 of FIGURE 1.

FIGURE 5 is a front view showing the second rotary piston member in position in the engine chamber, with portions of engine chamber cutaway.

FIGURE 6 is a cross-sectional view taken along line 6—6 of FIGURE 5 showing the second rotary piston member in position in the engine chamber.

Briefly stated, the rotary engine invention comprises an engine housing or chamber forming an outer chamber acting as a combustion chamber, a first and second rotary piston member each having a piston fixed along its outer end and adapted to travel in the outer chamber of the engine housing, each piston member having a disc portion, which disc portions each having an annular recess which cooperate together to form an inner compression chamber, each disc portion has vanes fixed in their respective recesses to provide the compression for the inner compression chamber, with intake and exhaust valves controlling the passage of gases between the inner and outer chamber for the operation of the engine.

Referring more particularly to the drawings in FIGURE 1, the rotary engine invention is illustrated having an engine housing 20, with the engine housing having an annular water jacket 21 about its circumference for cooling the engine, the engine housing has an annular chamber 22 with the outer portion 23 forming an outer combustion chamber.

Figure 4:
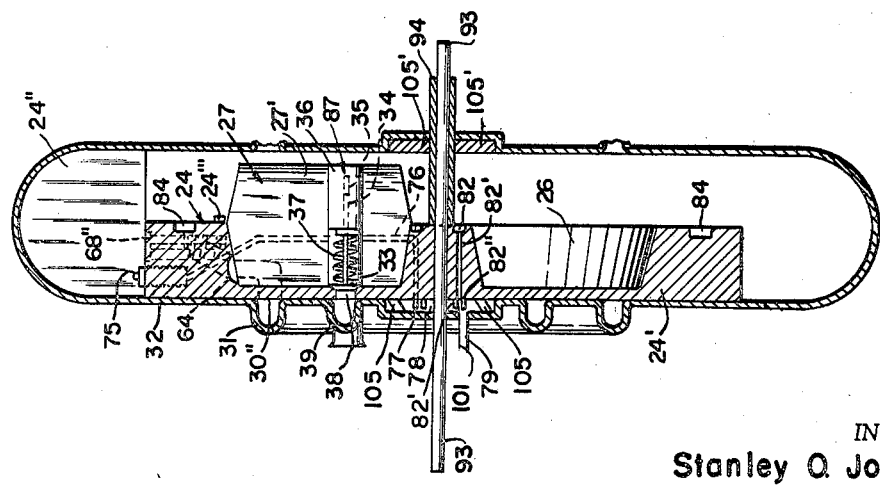
FIGURE 4 is a cross-sectional view taken along line 4—4 of FIGURE 1.

Within the annular chamber 23 are a pair of rotary piston members 24 and 25, the rotary piston member 24 has a central disc portion 24′ and a piston 24″ fixed to the outer edge of the disc portion 24′, the disc portion 24′ has an annular channel or recess 26 which extends annularly around the disc portion and terminates in a vane 27 (FIGURE 4) which forms a wall across the channel and has an outer portion 27′ which projects out beyond the disc 24′.

The second rotary piston member 25 also has a central disc portion 25′ and a piston 25″, fixed to the outer edge of the disc portion 25′, the disc portion 25′ has an annular channel or recess 28 which extends annularly around the disc portion 25′ and terminates in a vane 29, and forms a wall across the channel 28 and has an outer portion 29′ which projects outward beyond the disc 25′ into the channel 26 in the disc 24′ and when the piston member 25 rotates, the vane portion 29′ rotates annularly about the channel 26 in disc 24′.

Similarly, the outer portion 27′ of the vane 27 of disc member 24′ projects into the recess 28, and when piston member 24 rotates the vane portion 27′ rotates annularly about the channel 28 in disc 25′.

The rotary piston member 24 has an exhaust portion 30 which communicates at one end 30′ with the annular combustion chamber 23 of the engine housing 22 and its other end 30″ has a 90° bend and communicates with an annular exhaust ring chamber 31 in the one wall 32 of the engine housing 21.

Mounted on opposite sides of the vane 27 are a pair of poppet intake valves 33 and 33′. Each intake valves 33 and 33′ has a valve stem 34 which is slidably mounted in a bore 35 in each lob 36 and 36′ that projects on opposite sides of the vane 27. The lower end of each stem has a valve cup or seat 33 fixed thereto which is spring urged by a coil spring 37 to close a bore 38 immediately beneath the seat 33. The bores 38 communicate with an annular ring chamber 39 in the one wall of the engine housing.

The vane 29 of the disc member 25 has annular recesses 40 and 40′ on opposite sides of the vane 29 to receive the intake valves 33 and 33′ therein so that the pistons 24″ and 25″ and vanes 27 and 29 of the piston members 24 and 25 respectively may rotate into close proximity with one another.

An arcuate plate 41 is slidably mounted in arcuate channel 42 in the disc portion 24′ of the rotary piston member 24. The arcuate plate has a pair of coil springs 43 and 43′ fitted in the plate between the upright end 44 on an end of the plate and the upright block portion 45 along the other end of the plate. A lug 46 fixed to the disc portion 24′ and one end 46′ projects between the coil spring 43 and 43′ whereby if the plate 41 is sliding accurately in either direction in the channel 42, the coil spring will urge the plate back to a neutral position.

The disc member 24′ has a rectangular opening 47 which communicates with the arcuate plate 41. A leaf shaped cam 24′″ is pivotably mounted in the opening 47 to the disc member 24′ by a shaft 49 which shaft 49 has its outer ends 49′ and 49″ rotatably mounted in bores 50 and 50′ in the disc member. A bore 51 passes entirely through the block portion 45'. When the cam 24''' is pivoted clockwise when viewed from FIGURE 8, or from right to left when viewed from FIGURE 7, it moves to arcuate plate 41 to the right when viewed from FIGURE 7 moving bore 51 in alignment and communication with the outer end 30' of the bore 30 and the intermediate portion 30''' of the bore 30 to allow gases to pass through the bore 30.

Figure 7:
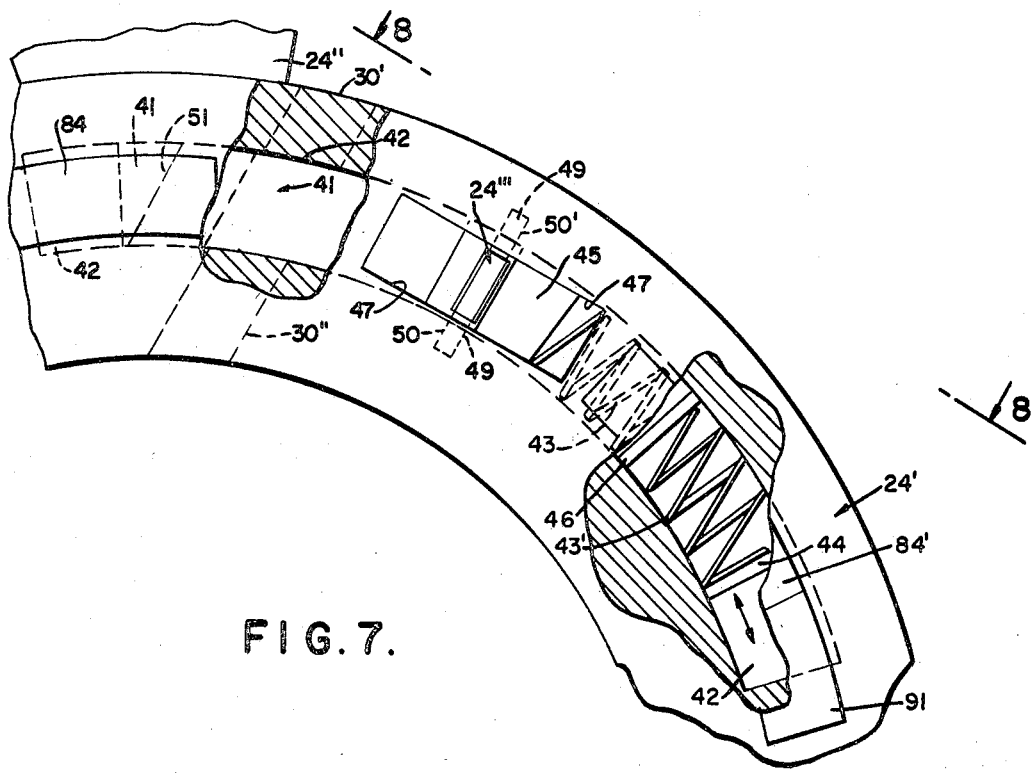
FIGURE 7 is an enlarged fragmentary view of the structure of the exhaust port annular slide and cam portion of the first rotary piston member.
Figure 8:
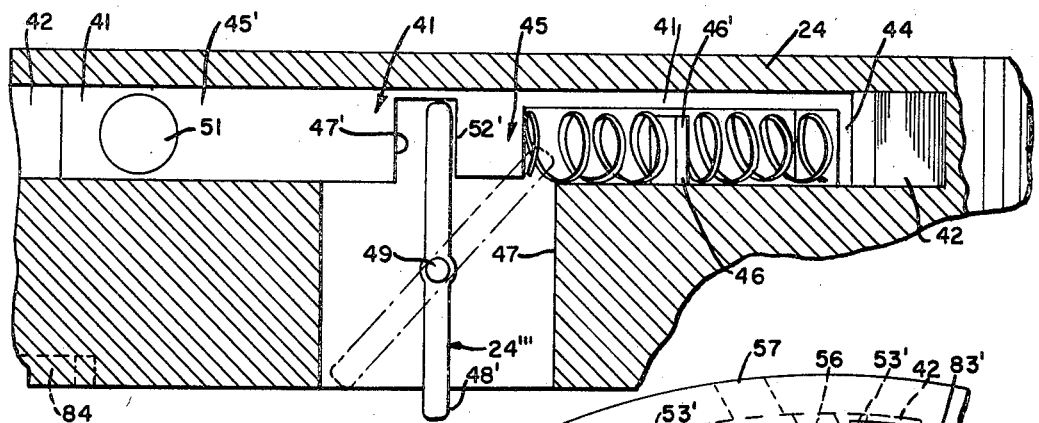
FIGURE 8 is a cross-sectional view taken along line 8—8 of FIGURE 7.
Figure 9:
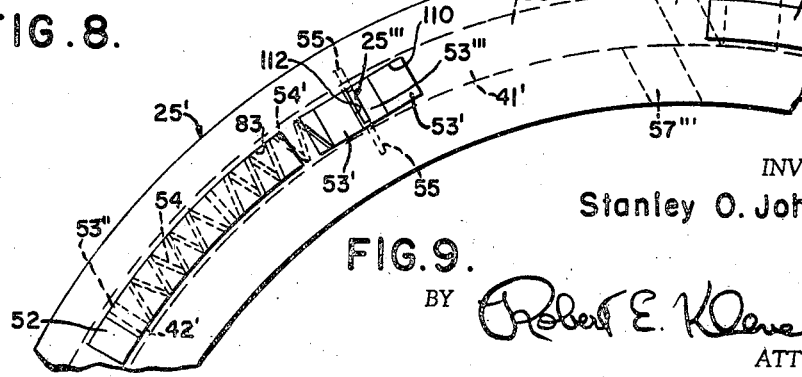
FIGURE 9 is an enlarged fragmentary view of the exhaust port and cam portion of the second rotary piston member.

When the ridge 52 of the disc member 25' moving clockwise when viewed from FIGURE 1 engages the outer end 48' of the cam 24''' it pivots the cam 24''' of disc member 24' clockwise when viewed from FIGURE 8, and the pivoting of the cam 24''' clockwise causes the cam to engage the upright wall portion 52' of the recess 47' of the upright block portion 45 of the plate 41 and slides the plate 41 arcuately clockwise when viewed from FIGURE 7, moving the bore 51 into communication with bore portions 30' and 30''' and thus opening the bore 30.

When the upper surface 83'' of disc member 25 has slid past the cam 24''' the recess 83' in the disc member 25 is reached, and the spring 43 will urge the plate 41 back to its position illustrated in solid lines and thus open the portion 30 again.

Similarly disc member 25' has a similar arcuate plate 41' which is arranged reversely to plate 41 which is slidably mounted in an arcuate channel 42' in the disc portion 25' of the rotary piston member 25. The arcuate plate 41' also has a pair of springs 54 and 54' fitted in the plate 41' between the upright end 53'' along one end of the block 41' and an upright block portion 53' along the other end of plate 41'. A lug 54 is fixed to the disc member 25' and one end of the lug projects between the coil springs 54 and 54' whereby if the plate 41' is slid arcuately in either direction in channel 42', the coil springs will urge the plate back to a neutral position.

The upright block portion 53 also has a recess 53''' therein and a leaf shaped cam 25''' is pivotally mounted in a rectangular opening 110 which opening communicates with the arcuate slide 41' and communicates with the recess 53'''. The cam 25''' is pivotally mounted to the disc member 25' by a shaft 55 in the same manner as shaft 49 is mounted to disc member 24'. A bore 56 passes entirely through the block portion 53. When the cam 25''' is pivoted clockwise when viewed from FIGURE 5, it moves the arcuate plate 41' counterclockwise by engaging the wall portion 112 of the recess 53''' until the bore 56 communicates with the outer end 57' of the bore 57 and the intermediate portion 57'''' of the bore 57 to allow gases to pass through bore 57 to its outer end 57'' and into the annular exhaust ring chamber 58 on the other wall 59 of the engine housing 22.

When the ridge 60 of the disc member 24' engages the outer end of the cam 25''' it pivots the cam and thereby moves the arcuate plate 41' counterclockwise when viewed from FIGURE 5 moving the bore 56 into communication with the bore portions 57' and 57''' and thus opens bore 57.

Figure 3:
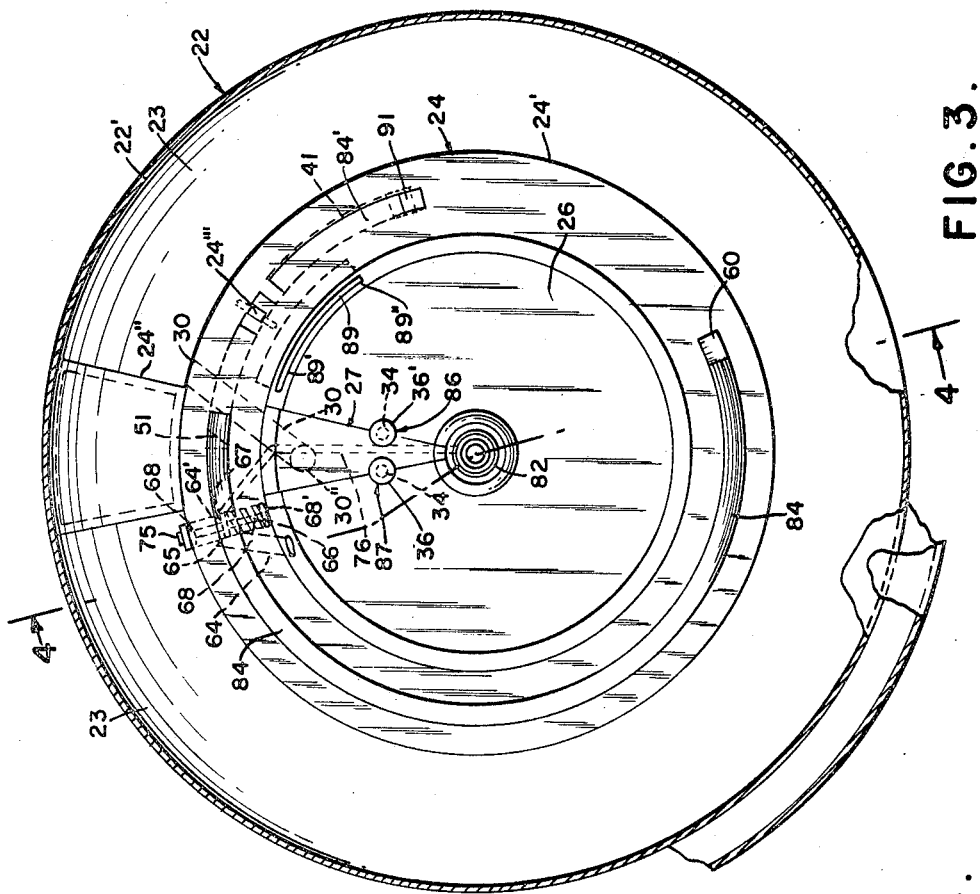
FIGURE 3 is a front view showing the first rotary piston member in position in the engine chamber with the engine chamber cutaway.

The disc member 24' has a diagonal bore 64 which communicates from the inner chamber 26 to a radial bore 64' which bore 64' communicates with the outer chamber 23 and a spring urged valve 65 is mounted in the radial bore 64' which is spring urged radially inward by a spring 66. Spring 66 abuts a ledge 67 fixed to the disc member 24' and the ledge 67 projects out into radial bore 64'. The ledge 67 has an open center area to allow the stem 68 of the valve 65 to pass through. The outer end of the stem 68 has a cap 68'' which closes radial bore 64' and the inner end of the stem 68 has an annular flange 68' which is engaged by the spring 66 to hold the cap 68'' closed as the spring 66 is under compression when the cap 68'' of the valve is in its closed position as illustrated in FIGURE 3.

Similarly disc 25' has a diagonal bore 69 which communicates from the inner chamber 28 to a radial bore 69' which bore 69' communicates with the outer chamber 23 and a spring urged valve 71 is mounted in the radial bore 69' and is spring urged radially inward by a spring 72. The spring 72 abuts a ledge 73 fixed to the disc member 25' and the ledge 73 projects out into the radial bore 69'. The ledge 73 has an open center area to allow the stem 74 of valve 71 to pass through. The outer end of stem 74 has a cap 74'' and the inner end of the stem 68 has an annular flange 74' which is engaged by the spring 72 to hold the cap closed as the spring 72 is under compression when cap 74'' of the valve is in its closed position illustrated in FIGURE 5.

Behind the cap 68'' on the disc member 24' (when viewed from FIGURE 3), a conventional spark plug 75 is mounted therein and projects out of the outer surface of disc member 24' and an ignition wire 76 is connected at one end to the spark plug 75 and at the other end making electrical contact with the outer annular metal ring 77 in an insulated collar 78 mounted to the wall and the metal ring 77 of the collar electrically connected by a wire 79 to a conventional distributor for igniting the spark plug 75.

Behind cap 74'' on disc member 25' (when viewed from FIGURE 5), a conventional spark plug 80 is mounted therein and projects out of the outer surface of disc member 25' and an ignition wire 100 is connected at one end to the spark plug 80 and at the other end makes electrical brush contact with the inner annular metal ring 82 of the disc member 24'. A wire 82' with disc member 24' connects ring 82 with the metal ring 82'' of the collar 78 and ring 82'' is electrically connected by a wire 101 to a conventional distributor for igniting the spark plug 80.

OPERATION

The rotary engine invention operates as follows: When piston 25'' is approximately 10 degree away and piston 25'' is to be fired, the spark plug 75 is ignited through ignition wire 76, and the annular ring 77 and wire 79 from the distributor, and this ignites the charged gases which will be already present in the outer chamber portion 81 between pistons 24'' and 25''. The explosion of the charged gases in the outer chamber portion 81 drives the piston 25'' clockwise when viewed from FIGURE 1, while piston 24'' is held from moving by a conventional one way annular ring clutch 105.

Also when the piston 25'' is 10 degrees away from piston 24'' and piston 25'' is being fired, the cam or dog 24''' of piston 24'' will be in the channel portion 83, and upon movement of piston 25'' will engage the cammed end 52 of channel portion 83 which will pivot the cam 24''' from right to left or counterclockwise when viewed from FIGURE 3 which will move the arcuate slide 41 *clockwise* when viewed from FIGURE 3 which brings the bore 51 of the arcuate slide into alignment with the exhaust port 30 allowing burned gas from the previous ignition in chamber portion 81' to be exhausted from the chamber out port 30 and the exhaust ring 31 in the engine housing. The cam 25''' will be in the channel 84 of disc 24'' and consequently the exhaust port 57 of piston 25' will remain closed at 10 degrees.

When piston 25'' reaches approximately 135 degrees away from piston 24'' after the firing of piston 25''', as illustrated in phantom lines and designated by numeral 85, the cam 24'' returns to channel portion 83' after riding on the upper surface 83'' between the channel portion 83 and 83''. While riding the upper surface this held the cam in its pivoted position and this held the exhaust port 30 open. However when piston 25'' reaches approximately 135 degrees and the cam 24'' returns to the channel portion 83' this allows the cam to swing back to neutral which closes the exhaust port 30.

When piston 25'' reaches approximately 225° away from piston 24''', the cam 25''' reaches the end channel 84 and engages cam surface 60, however since it is engaging it from counterclockwise direction and this pivots the cam 25''' counterclockwise when viewed from FIG- URE 5, it moves the arcuate slide clockwise to a further closed position; and this does not open the exhaust port 57 of piston 25''.

When piston 25'' reaches approximately 10 degrees away from piston 24'' and to the left of piston 24 as viewed from FIGURE 1 and continuing in its clockwise direction, the dog 25''' returns to channel portion 84' which allows the cam 25'''' to return to neutral so as to be reset, while cam or dog 24'''' remains in the channel portion 83'.

During the firing stroke of piston 25'', the cam or dog 24'''' has allowed the gases to exhaust from the outer chamber 23 from the previous firing, while the piston 25'' moved from 10 degrees to approximately 135 degrees away from piston 24'' and after that closed.

The dog 25''' during the firing stroke of piston 25'' moves plate 41 to a second closed position.

During the firing of piston 25'', at approximately 10 degrees apart, there is a further operation taking place. The piston 25'' moves until it reaches approximately 15 degrees apart at which time the left intake valve 87 opens under pressure and feed fresh charge of gas into the inner chamber portion 88 as the piston 25'' continues to swing around clockwise it draws the charged gases in the inner chamber portions 88.

The chamber portion 88' has already received a fresh charge of gases during the previous firing operation and as the vane 29 continues around it continues to compress the gases in the inner chamber portions 88' until the pressure in the inner chamber portions 88' exceeds the pressure in the outer chamber portion which is being exhausted by exhaust port 30. When the pressure in the inner chamber portions 88' exceeds the pressure in the outer chamber 81' portion, the charged gases in the inner chamber passes out the diagonal bore 69 and the radial bore 69' through the cap 74'' which is forced outwardly of the spring urged valve 71, into the outer chamber portion thus forcing the fresh charge into the outer chamber portion further exhausts the burned gas therein, until piston 25'' passes approximately 135 degrees at which time the exhaust port 30 closes. The movement of the piston 25'' past the 135 degrees and its vane 29 continues to force gases into the outer chamber from the inner chamber portions 88' until the pressure equalizes.

The piston 25'' continues clockwise with its vane 29 continuing to compress the gases until the vane 29 reaches the bypass slot 90 when piston 25'' is approximately 15 degrees from piston 24'', at which time the gases in the front of the vane 29 as it moves travel from the one end 90' to the other end 90'' and bypass the vane and transfer to the opposite side of the vane from the inner chamber portion 88' to the inner chamber portion 88.

While piston 25'' was moving from piston 24'' during firing the inner chamber portions 88 were expanding and drawing in a fresh charge. When the bypass slot 90 of piston 24 is reached, this causes the gases from chamber portions 88' to bypass into inner chamber portions 88 providing a super charge of the fresh gases in inner chamber portions 88 at the time when piston 25' reaches approximately 15 degrees from piston 24'', and piston 24'' is now about to be fired.

When piston 25'' reaches approximately 10 degrees away from piston 24'', piston 24'' is fired through the spark plug 80 of disc 25, which receives an electrical ignition from wire 100, and the outer metal ring 82 and wire 101 from the distributor.

The firing of piston 24'' repeats the operation:

The explosion of the charged gases in the outer chamber portion 81' drives the piston 24'' clockwise when viewed from FIGURE 1, while piston 25'' is held from moving by a conventional one way clutch 105'.

Also at the time of firing of piston 24'', the cam or dog 25''' will be in the channel portion 84' and upon movement of piston 24'' will engage the cammed end 91 of channel portion 84' which will pivot the dog 25''' clockwise when viewed from FIGURE 5 or from right to left when viewed from FIGURE 5 which brings the arcuate slide 41' counterclockwise when viewed from FIGURE 5 which brings the bore 56 into alignment with exhaust port or bore 57 allowing the burned gases from the ignition of piston 25''', just previously in the outer chamber 81 portion, of chamber 23 to be exhausted out through port 57 and into the exhaust ring 31' in the engine housing. The cam 24''' will be in channel 83' of disc 25'' and consequently the exhaust port 30 of piston 24'' will remain closed at 10 degrees.

When piston 24'' reaches approximately 135 degrees away from piston 25'' after the firing of piston 24'', in the same positional relation as 25'' was to 24'' illustrated in phatom line and designated by numeral 85, the cam 25''' returns to the channel portion 84, after riding on the upper surface 84'' between channel portions 84 and 84''. While riding on this upper surface 84'', this held the cam 25''' in its pivoted position and thus kept the exhaust port or bore 57 open. However when piston 24'' reaches approximately 125 degrees and the cam 25''' returns to channel portion 84, this allows the cam to swing back to neutral which closes the exhaust port 57.

When piston 24'' reaches approximately 225 degrees away from piston 25'', the cam 24''' reaches the end of channel 83' and engages cam surface 52', however since it is engaging it from a clockwise direction when viewed from FIGURE 3 and this pivots the cam 24''' clockwise when viewed from FIGURE 3, it moves the arcuate slide 41 counterclockwise to a further closed position, and this does not open exhaust port 30 of piston 24''.

When piston 24'' reaches approximately 10 degrees away from piston 25'' it has reached approximately the end of its stroke, and is in the same positional relationship that piston 25'' was to 24'' during the firing of piston 25. At this position the dog 24''' returns to channel portion 83 which allows the cam 24''' to return to neutral so as to be reset, while cam or dog 25''' remains in channel portion 84.

During the firing stroke of piston 24''', the cam or dog 25''' has allowed gases to exhaust from the outer chamber 81 from the previous firing from the time that piston 24'' moved from 10 degrees at firing to approximately 135 degrees away from piston 25'' and after that it closed. The cam 24''' however has been inactive during the firing stroke of piston 24''.

During the firing of piston 24'', at approximately 10 degrees apart, there is a further operation taking place. The piston 24'' moves until it reaches approximately 15 degrees apart at which time the right intake valve 86 when viewed from FIGURE 3, opens under pressure and feeds a fresh charge of gas into the inner chamber portions between vanes 27 and 29 (88') which corresponds to chamber portion 88 in positional relationship during the firing of piston 25''.

The chamber portions 88 to which the left intake valve 87 has access have already received their fresh charge of gases during the firing of piston 25'' and as the vane 27 continues around with piston 24'' it continues to compress the gases in the chamber portions to which valve 87 has access (and which portions would correspond in positional relationship to chamber portions 88' during the firing of piston 25'') until the pressure in these inner chamber portions exceeds the pressure in the outer chamber portions which is being exhausted by exhaust port 57. When the pressure in the inner chamber portions, to which valve 87 has access, exceeds the pressure in the outer chamber portions, the charged gases in the inner chamber portion passes out the diagonal bore 64 and 64' through the cap 68'' of valve 65 which cap 68'' is forced outward by the gas pressure, and the gas passes out the bore 64' into the outer chamber portions thus forcing the fresh charge into the outer chamber further exhausting the burned gases therein, until piston 24'' passes approximately 135 degrees at which time the exhaust port closes. As the movement of the piston 24" and vane 27 past 135 degrees continues the vane 27 continues to force gases into the outer chamber from the inner chamber until the pressure equalizes.

Piston 24" continues clockwise with its vane 27 continuing to compress the gases until vane 27 reaches the bypass slot 92, when piston 24" is approximately 15 degrees from piston 25", at which time the gases in front of vane 27, chamber 88 as it moves, travel from one end 92' to the other end 92" and bypass the vane and transfer to chamber 88'.

When piston 24" was moving from piston 25" during the firing, the inner chamber portions, to which valve 86 has access and which corresponds to 88', were expanding and drawing in a fresh charge of gases. When the bypass slot 92 was reached this causes the gases from the chamber portions to which intake valve 87 has access to be transferred to the chamber portions to which intake valve 86 has access providing a super charge of gases in the chamber to which valve 86 has access at the time when piston 24" reaches approximately 15 degrees from piston 25" and piston 25" is again to be fired.

When the piston 24" reaches approximately 10 degrees from piston 25, the piston 25 is fired through spark plug 75 and the operation repeats itself as already described.

The piston 24" drives shaft 93 and piston 25" drives shaft 94 which are mounted in coaxial relationship and a conventional differential mechanism is, not shown, utilized to combine their movement into a single driving source of power.

Thus it will be seen that a novel rotary engine invention has been provided that is compact and can be manufactured with a minimum amount of parts and which has a construction whereby the piston combustion chambers can be easily and quickly charged and exhausted and can provide superior power and operation.

It will be obvious that various changes and departures may be made to the invention without departing from the spirit and scope thereof and accordingly it is not intended that the invention be limited to that specifically described in the specification or illustration in the drawings but only as set forth in the appended claim.

What is claimed is:

1. A rotary engine having an annular housing, a pair of disc members rotatably mounted in coaxial relation within the housing with each disc member having a piston at its outer edge which pistons travel arcuately within the outer interior portions of the housing, said disc members having cooperating portions forming an inner pre-combustion chamber for pre-compressing fresh gases prior to their combustion, said housing having pressure differential means to transmit the pre-compressed gases from the pre-compression chamber to the outer interior portions of the housing in the line of travel of the pistons for combustion; said pistons and outer interior portions of said housing forming a combustion chamber, said housing having annular ring conduit means to transmit the burnt gases from the combustion chamber out of the engine after combustion.

References Cited

UNITED STATES PATENTS

| | | | |
|---|---|---|---|
| 1,095,730 | 5/1914 | Jacklin | 123—11 X |
| 1,212,649 | 1/1917 | Krikorian. | |
| 1,879,422 | 9/1932 | Nash | 123—11 |

C. J. HUSAR, Primary Examiner